(12) United States Patent
Foote (10) Patent No.: US 7,822,821 B2
(45) Date of Patent: Oct. 26, 2010

(54) ACCESS POINT OBJECT DEPOSITABLE ON A WEB PAGE AND USEFUL FOR INITIATING COMMUNICATION BETWEEN DEPOSITING USER AND BUDDY

(76) Inventor: David Foote, 5 National Pl., Irvine, CA (US) 92602

( * ) Notice: Subject to any disclaimer, the term of this patent is extended or adjusted under 35 U.S.C. 154(b) by 966 days.

(21) Appl. No.: 11/488,925

(22) Filed: Jul. 18, 2006

(65) Prior Publication Data

US 2008/0021958 A1    Jan. 24, 2008

(51) Int. Cl.
*G06F 15/16*    (2006.01)
(52) U.S. Cl. .................... 709/206; 709/202; 709/204; 709/217
(58) Field of Classification Search ......... 709/202–206, 709/217–219, 229
See application file for complete search history.

(56) References Cited

U.S. PATENT DOCUMENTS 6,920,478 B2 *  7/2005  Mendiola et al. ............ 709/219
7,191,239 B2 *  3/2007  Rozenfeld et al. ........... 709/229
7,290,041 B2 * 10/2007  Mendiola et al. ............ 709/218
7,292,870 B2 * 11/2007  Heredia et al. .............. 709/206
7,359,943 B2 *  4/2008  Szeto et al. ................. 709/206
7,466,810 B1 * 12/2008  Quon et al. ................. 709/202

* cited by examiner

*Primary Examiner*—Bhararat N Barot
(74) *Attorney, Agent, or Firm*—John L. Rogitz (57) ABSTRACT

Wablet is a real time messaging platform that allows people to communicate with each other over the Internet. Unlike current methods of Internet communication, contact can be established and maintained without disclosing personal identity or permanent contact information such as an email address, IM handle, phone number or first and last name. Thus, communication can be undertaken without binding any user to any instant messaging system, and can be accessed over the web from any browser on any desktop platform without downloading or installing a client side application. In essence, Wablet acts as form of online calling card that allows instant communication from any web page, comment on a page, email signature, or URL. such that internet communication and contact with strangers is enabled by providing mechanisms to represent contextual online identity and reputation in the form of a digital caller ID that can be presented in order to initiate contact.

36 Claims, 9 Drawing Sheets

ACCESS POINT OBJECT DEPOSITABLE ON A WEB PAGE AND USEFUL FOR INITIATING COMMUNICATION BETWEEN DEPOSITING USER AND BUDDY

I. FIELD OF THE INVENTION

The present invention relates generally to communication between peers over a wide area network such as the Internet.

II. BACKGROUND OF THE INVENTION

Peer-to-peer communication over the Internet can be effected in several ways. Perhaps the most common is email, in which users communicate with each other by sending messages through respective email servers to each other's email address. Plainly, email communication requires a priori knowledge of a recipient's email address.

Instant Messaging (IM) is also used, in which two users, using a special IM program that they both must obtain, communicate with each other using prearranged IM addresses. Stated differently, to communicate using IM, both users must obtain a special IM program and both must prearrange to communicate over IM by exchanging IM addresses.

Yet another Internet communication method is chat, in which users can "join" a chat room hosted on the Internet to communicate with each other. An example of chat is provided by Myspace. In one implementation a user must be logged in to a special chat server to chat with another user who is also logged in to the special chat server. This system requires the receiving user to be logged in and looking at his/or her profile page, while the calling visitor is also looking at the same profile page. In another chat implementation, a client program can be downloaded to allow two users to communicate with each other, but as in the former implementation both users must log in separately to the downloaded client program on the one and only one hosting server.

With the above overview in mind, the present invention makes the following critical observations about current Internet communication methods. Typically, use of chat requires the divulgation of an email address to unknown users, who can use the email address for unwanted spamming, unwanted contact, etc. Accordingly, it would be desirable to permit users to communicate with each other peer-to-peer without revealing their identity or email address simply to initiate contact, although having the option of screening is also desirable in some circumstances.

Still further, the present invention understands that if the above critical observations are addressed, several additional advantageous features may be introduced, including, as further described below, allowing people to instantly communicate with people they don't already know using what might be thought of as a digital caller ID using personas and reputation to introduce users to each other without revealing private information.

SUMMARY OF THE INVENTION

A method for Internet communication includes providing an access point object to a user. The access point object can be deposited by the user on any Web page permitting Internet users to add markup language code to the Web page. Using the access point object, a buddy is allowed to initiate communication with the user through respective browsers of the user and buddy. The user is not constrained to be accessing the Web page when communicating with the buddy using the respective browser.

In some implementations the user accesses a communication web site that is different than the Web page to communicate with the buddy using the access point object. The access point object can display an online status of the user if desired. Also, if desired the access point object can permit a prospective buddy a choice of logging in anonymously or with a validated user name, with the validated user name being associated with verifiable user information. In this regard, identity or reputation elements may be provided by inserting a URL substantiating the buddy's validation claims. For example, a third party Web site may carry identity information that can be used to initiate contact. In general, mechanisms may be provided to allow buddies to reference identity and reputation information that can be provided to another user to initiate contact.

Buddies can be screened for, e.g., reputation, identity, connectedness, and group affiliation. Screening may also account for financial concerns, e.g., whether a prospective buddy is willing to pay for each time interval of contact. According to user desires, the access point object can display personal information about the user. In the event that the user is offline on a particular access point, a message from the buddy to the user can be stored on the communication web site.

The user may derive plural access point objects from core identity information the user has established, with each access point object being associated with a respective persona and with each persona being associated with a respective group of elements that is a subset of the core identity information. Each group of elements is different from other groups of elements such that the personas associated with the respective access point objects are different from each other. Thus, a first persona may indicate commercial reputation of a user and no demographic information of the user, and the corresponding access point object can be deposited on a commercial Web site. In contrast, a second persona may indicate no commercial reputation of a user and may indicate demographic information of the user, with the corresponding access point object being deposited on a social networking Web site.

Advantageously, the user can manage all access point objects using the communication web site from an access point management page. Using the management page, the user can establish, for each access point, the status of whether the user for purposes of the access point is online, and other statuses (e.g., busy, out to lunch, customized statuses, etc.) can be provided. Also, using the management page, the user can establish, for each access point, a threshold of permitted contact for the access point.

In another aspect, a computer accesses a markup language object that is deposited by an owner of the object on any Web page permitting Internet users to add markup language code to the Web page. The object establishes a calling card of the owner through which a buddy can initiate communication with the owner using only browsers of the owner and buddy.

In still another aspect, a system is disclosed for facilitating communication over a wide area network between a user of an access point and one or more buddies. The system includes a server on the network and communicating with a computer of the user for allowing the user to establish core identity information. The user is permitted to derive at least first and second access points from the core identity information. The first and second access points are associated with respective first and second personas, and each persona is associated with a respective group of elements that is a subset of the core identity information. Each group of elements is different from other groups of elements such that the first persona is different from the second persona. The first access point can be deposited by the user on a first web site and the second persona can be deposited by the user on a second web site.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
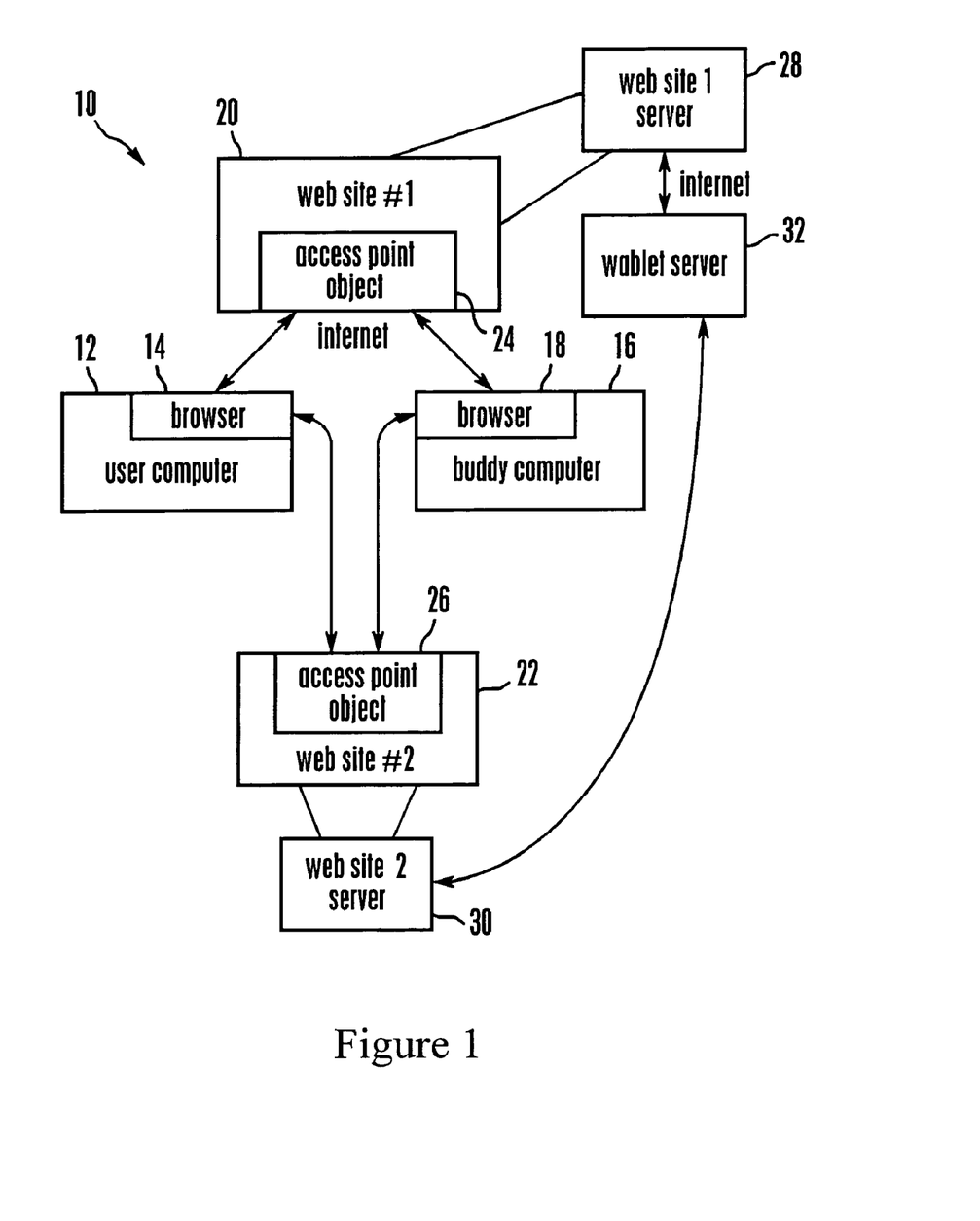
FIG. 1 is a block diagram of a non-limiting embodiment of the present system.

Referring initially to FIG. 1, a system is shown, generally designated 10, that includes at least one user computer 12 with associated Web browser 14 communicating with at least one buddy computer 16 with associated browser 18 in accordance with the disclosure below. As shown, the computers 12, 16 communicate with each other through one or more web sites 20, 22 by means of access point objects 24, 26 that are respectively deposited on the web sites 20, 22 by a user of the user computer 12. With more specificity, the computers 12, 16 communicate with each other over the Internet or other wide area network through the access point objects 24, 26 that have been deposited on the web sites 20, 22 by a user of the user computer 12.

FIG. 1 shows that the first web site 20 is hosted on a respective web site server 28, while the second web site 22 is hosted by a server 30. Both servers 28, 30 may communicate over the Internet with a system server, referred to herein as a "wablet" server 32, for purposes to be shortly disclosed. Accordingly, it is to be understood that while FIG. 1 shows for ease of illustration communication arrows extending between the access point objects and the browsers of the user and buddy computers, these are software abstractions, and communication physically occurs among the web site servers 28, 30, the wablet server 32, and the processors of the computers 12, 16.

In accordance with present principles, an access point object (24 or 26) is portable, and can be downloaded from the wablet server 32 or otherwise provided to the user computer 12 for configuration as described below and depositing by the user computer 12 on any web site or, as shown in FIG. 1, on plural web sites at once. A user can deposit an access point object that is unique to that user on any web site on which the user has authoring rights or on any web site that allows users to embed hypertext markup language (HTML) or other markup language (e.g., XML) code. The access point object has an interface that can both display the online presence of the user, and provide a mechanism by which the user can be contacted and communicated with from within the web page where the access point is embedded. Additionally, a user can deposit a unique URL (assigned to the user by the wablet server 32 upon account registration). This URL points to a web page that contains an embedded access point. The URL can be of the form www.wablet.com/John_Smith. By clicking on the URL, the buddy or site visitor is transported to a web page that contains the online equivalent of a calling card (info about the user) as well as an access point object that can be used for communicating with the user from directly within the web page. With this approach, a user can display his online presence and provide a means of contact on any web site without revealing an email address or identity.

As intended herein, the access point objects 24, 26 are derived from a common template but can be modified by a user of the computer 12 to be different from each other to convey different "personas", each of which is related to the user. For instance, one access point object 24 may be purposed to foster professional contact, whereas another object 26 may be on, e.g., a blog web page to allow contact for political reasons, and a still further access point object can be configured to foster social contact on a social site such as myspace or friendster. A single persona can be used to establish multiple access points.

In any case, each access point object 24, 26 allows buddy computers 16 to connect directly to the user computer 12 through the browsers 14, 18 such that real time chat-like communication is facilitated while a buddy is on a web page on which the access point object is displayed and the owner is on another web page, e.g., the access point management page shown in FIG. 16 and described further below. Thus, communication is not tied to any particular site or special IM or chat program but only to whatever site the owner decides to deposit the access point object on. Further, each access point object 24, 26 displays only the minimum information deemed necessary by the user of the computer 12 for public display in the particular context in which it is used. No buddies contacting the user through a particular access point object need know about the user's other access points or any relationship between them. Moreover, as set forth further below, each access point object can have self-contained mechanisms to screen contact and display presence information that is contextual to the particular context in which the access point object is used.

Figure 2:
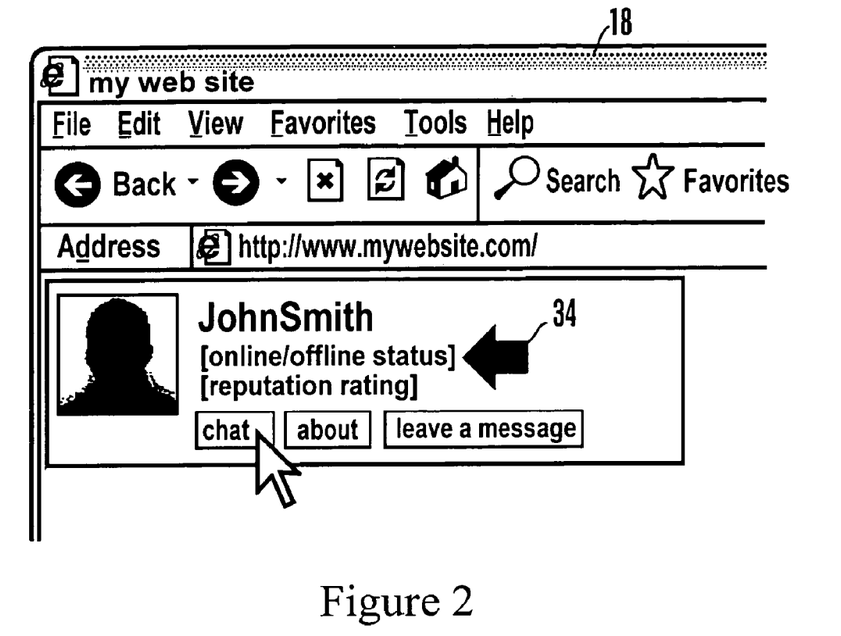
FIGS. 2-13 show various access point interfaces that are presented on the browser of the buddy computer.

Now referring to FIG. 2 et seq., each access point object 24, 26 is an interface embedded on a web page but hosted on the Wablet server 32 to allow a buddy to initiate online communication with the user who owns the access point. As stated above, access point objects 24, 26 can be embedded on any web page that supports HTML references to other sites. An access point object can be embedded either by the owner of a web site or left as a comment on a web site that allow comments with HTML code.

Communication is routed to the owner of the access point object based on one of two methods. Assume that the first web site 20 is registered to the owner of the access point object 24. In this case, the communication is sent directly to the user computer 12. In contrast, assume that the second web site 22 is not registered to the owner of the access point object 26. In this case, the access point object 26 maintains a unique but disposable routing number and that, if desired, can expire at the termination of communication. This routing number typically does bear any relation to the owner, but is simply embedded in the access point code for use in routing. New access points with different routing numbers can be generated if existing access points are compromised.

Accordingly, communications sessions initiated through the system can be abstracted from the access point object by use of disposable addresses that are dynamically created and remain active throughout the course of the communication. The temporary address is not visible to the users, serving as a means of further shielding users from unwanted contacts and/or generally maintaining control over the various parameters of availability or online presence.

Figure 3:
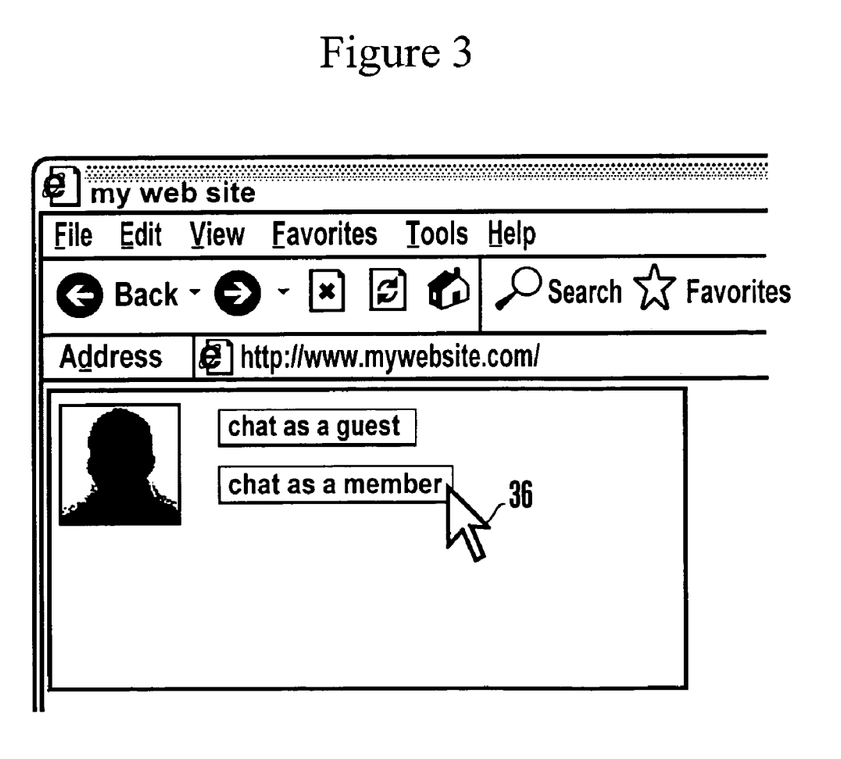

As shown at 34 in FIG. 2, an access point object interface that is displayed in the browser 18 of the buddy computer 14 when the browser 18 is at the web site 20 or 22 can show the status (offline or online) of the owner of the access point. The access point object may also obfuscate the owners status based on owner preferences. Additionally, as shown at 36 in FIG. 3, the access point interface can allow a buddy to select to log in as a member. Moving to FIG. 4, as shown at 38 login ID validation for the buddy wishing to communicate with the owner of the access point can be undertaken using the buddy's user name and password. In essence, logging in as a member establishes a caller ID based on an earlier registration with the system server, thereby providing verifiable identifying information on the buddy. Members who are logged into the system, e.g., on an access point or on the access point management page shown in FIG. 16 described below, can be auto-logged into access points on any web page they might happen to visit such that repeated logins are unnecessary.

Figure 4:
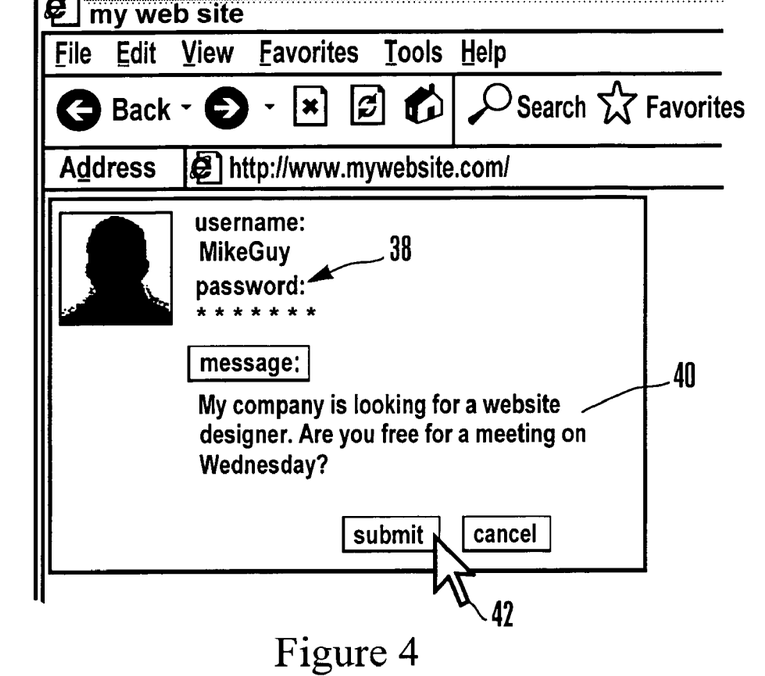

An initial message, essentially an invitation to converse, can be typed into a message box 40 of the access point interface as shown. These inputs are submitted by clicking onto a submit button, indicated at 42, which causes the invitation to converse to be displayed in the browser 16 of the user computer 12. Validation of a non-anonymous buddy wishing to initiate conversation can result in a digital persona identifier presented to the owner of the access point.

Figure 5:
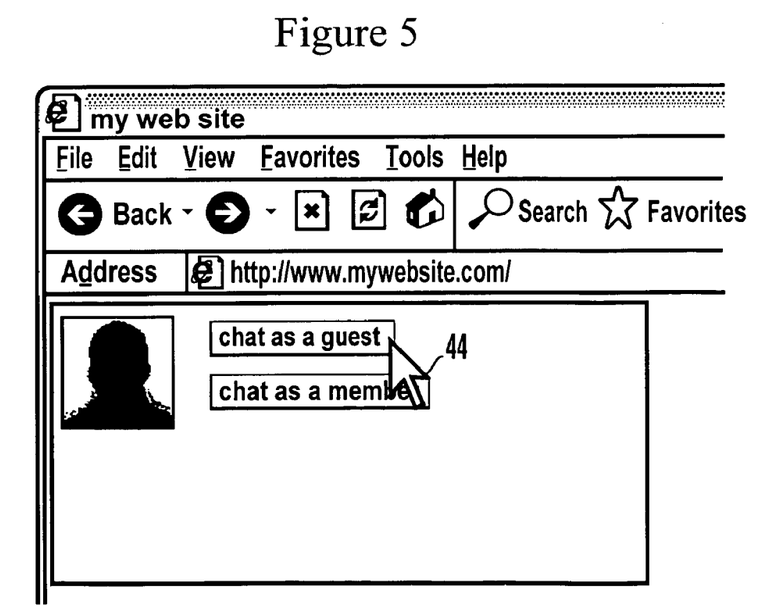

Alternatively, a buddy may click on a "guest" button 44 (FIG. 5) to initiate conversation anonymously. In one implementation, a flash component can be downloaded into the anonymous user's browser at this point transparently to the buddy to facilitate communication using the access point object, so that no chat client need be downloaded by the buddy. The access point may be a flash object that already contains the mechanism to chat, which can be hidden in the initial state.

Figure 6:
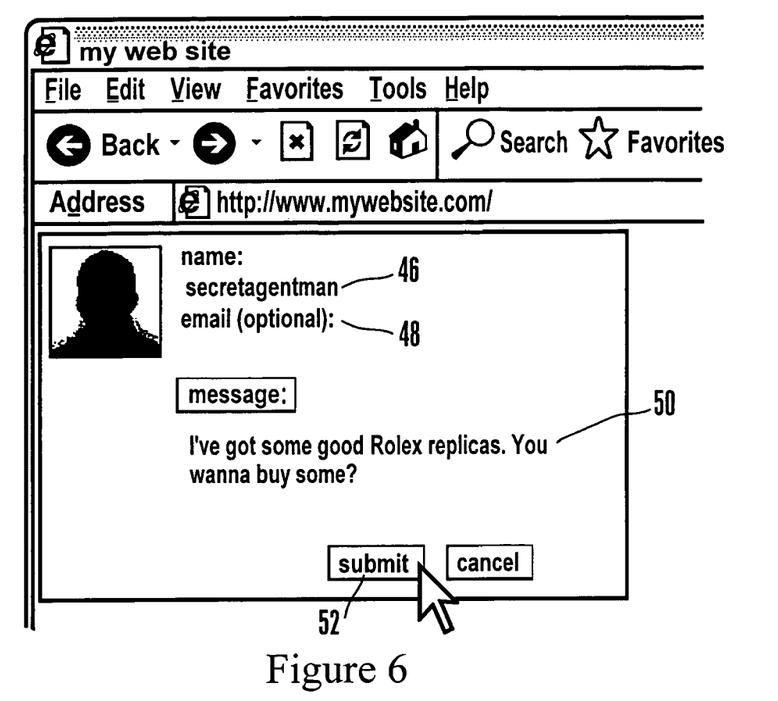

In any case, the above operation results in the display shown in FIG. 6, in which the buddy can enter a temporary name into an anonymous name box 46 and, if desired although not required, also enter an email address in an email box 48. Importantly, without revealing any permanent information including without revealing an email address, an anonymous buddy can enter an introductory message into a communication invitation box 50, and click on a submit button 52 to send the message to the browser 16 of the user computer 12. If the owner of the access point is "offline", the message is not lost, but is recorded by the system server for later retrieval when the owner is back online for that particular access point. Indeed, a history of all chats that have been conducted at all of an owner's access points can be maintained for review by the owner. In any case, the introductory message provides context for the communication to the owner of the access point, who may chose to accept or deny the request.

Figure 7:
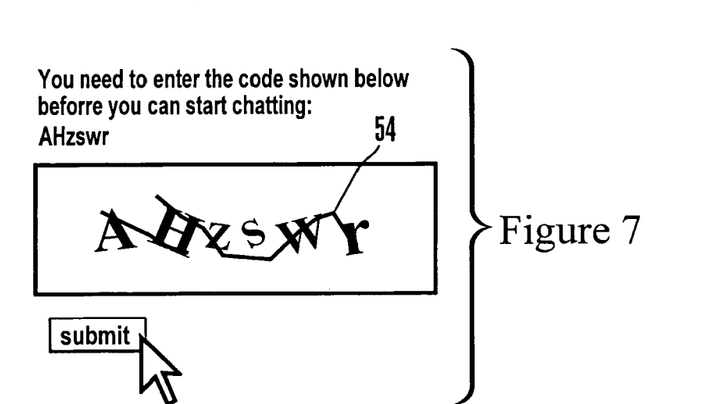

In addition to the above, the access point interface can provide the following additional features. Robot or computer initiated communication requests can be screened, one method for which is shown in FIG. 7, wherein the access point interface queries for information such as visual translation of on-screen elements 54 to screen out automated communication requests. Furthermore, for non-anonymous buddies, screening based on reputation or identity can be undertaken to, e.g., allow only access for users based on reputation (e.g., "nice girls only"), buddy identity (e.g., "don't let Homer in"), or group affiliation (e.g., "screen out all buddies associated with ABC Corp.") If desired, reputation screening can be based on threshold values that can be numeric in nature, e.g., don't allow chats with anyone with less than "X" friends, or more than "Y" negative comments, as maintained by the system server.

Figure 8:
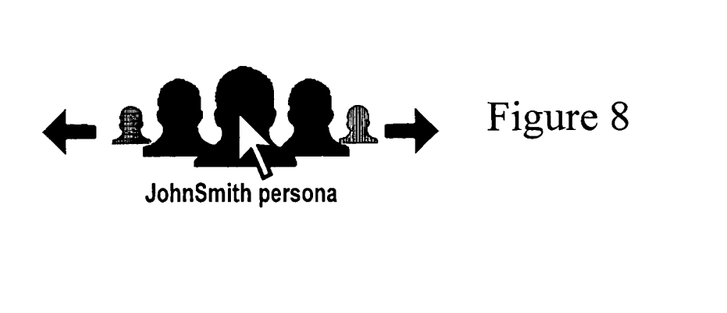

Additionally, FIG. 8 shows that buddies, particularly non-anonymous (registered) buddies, are allowed to choose a persona they would like to use to initiate the communication.

Figure 9:
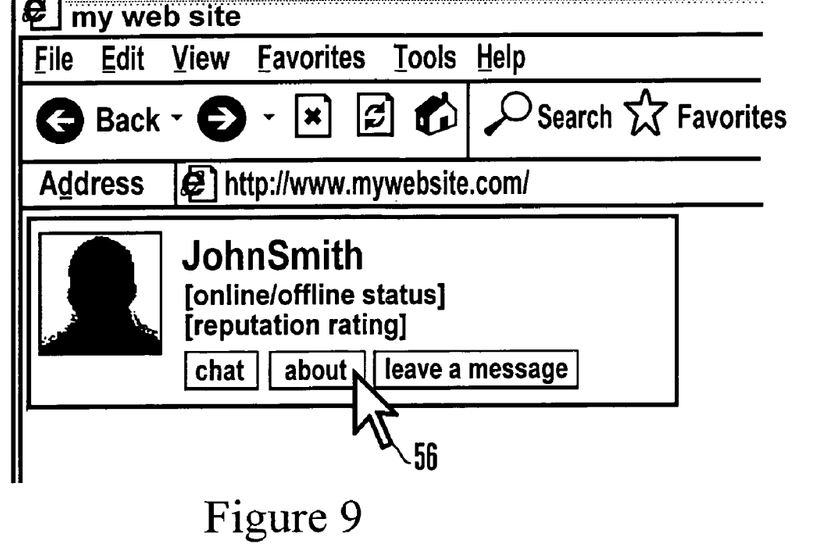
Figure 10:
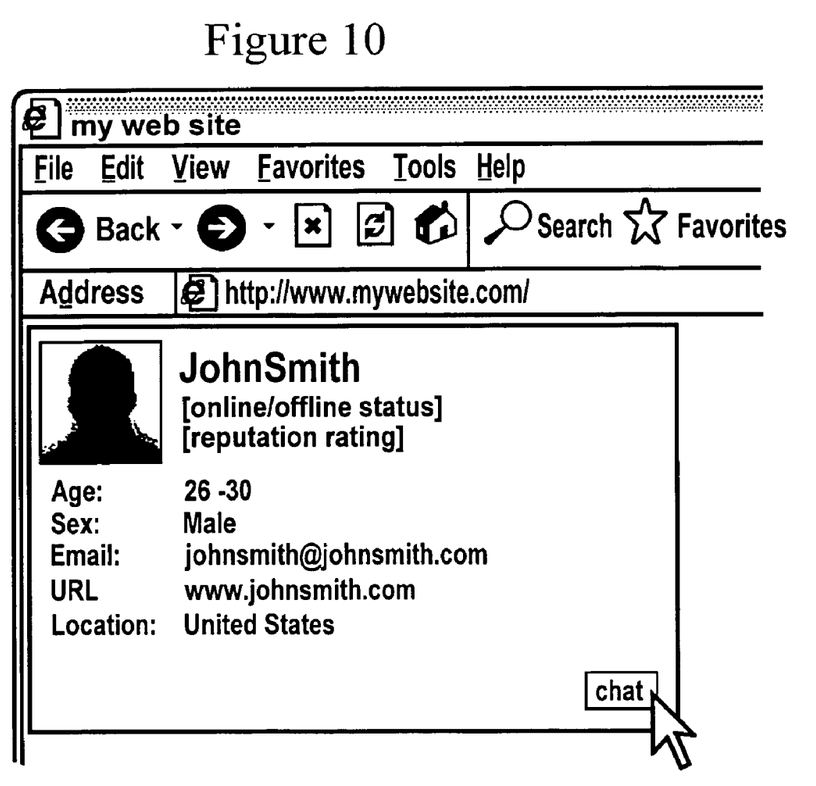

As shown in FIG. 9, a prospective buddy can select an "about" button 56 to view references and background information on the owner of the access point. As set forth further below, what information is provided on a particular access point is defined by the owner. FIG. 10 shows the resulting display of the owner information, which may indicate only commercial reputation of a user and no demographic information of the user, in which case the corresponding access point object might be deposited on, e.g., a commercial Web site. Or, no commercial reputation but only demographic information of the user and possibly social reputation information may be displayed, in which case the corresponding access point object might be deposited on a social networking Web site. Combinations of such information can be defined by the user for any particular access point object.

Figure 11:
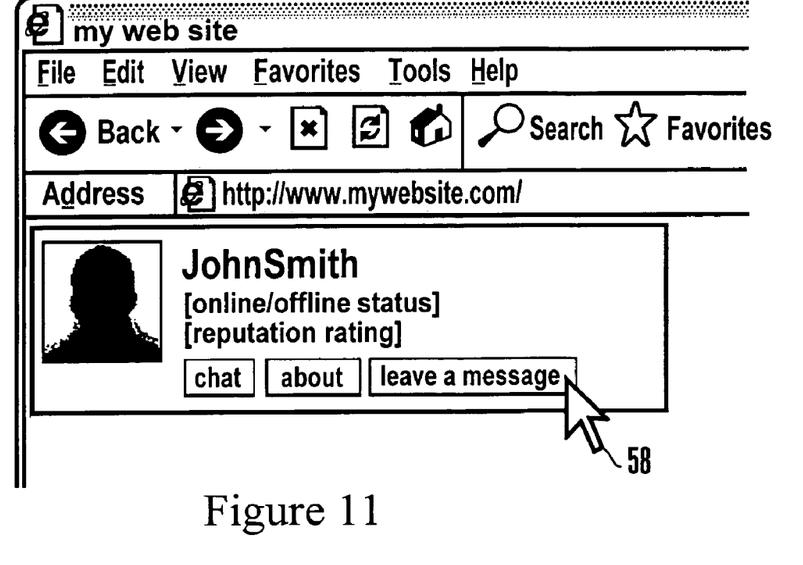
Figure 12:
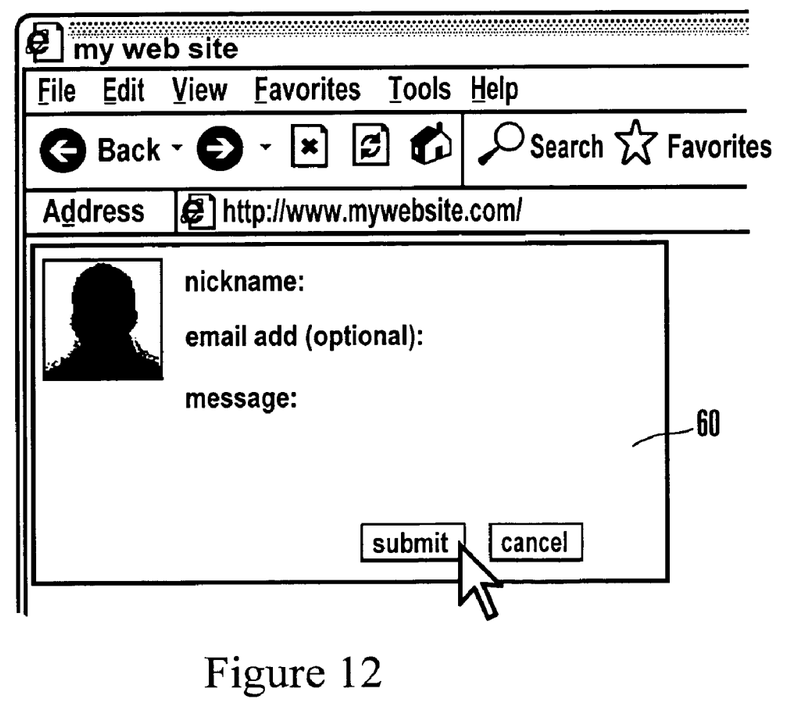

FIG. 11 shows that, as mentioned above, when the owner designates his presence at a particular access point to be "offline", a buddy can click on a "leave a message" button 58 to send a message to the owner of the access point that is equivalent to email, but without needing a specific email address to perform this function. FIG. 12 shows the resulting display, wherein a message can be typed into a message box 60 and sent to the owner of the access point. Additionally, using, e.g., the invitation message and/or the object linking feature discussed further below, a mechanism is provided for the buddy and owner/user to propose communication using text messages (instant messaging) voice, email or video.

Figure 13:
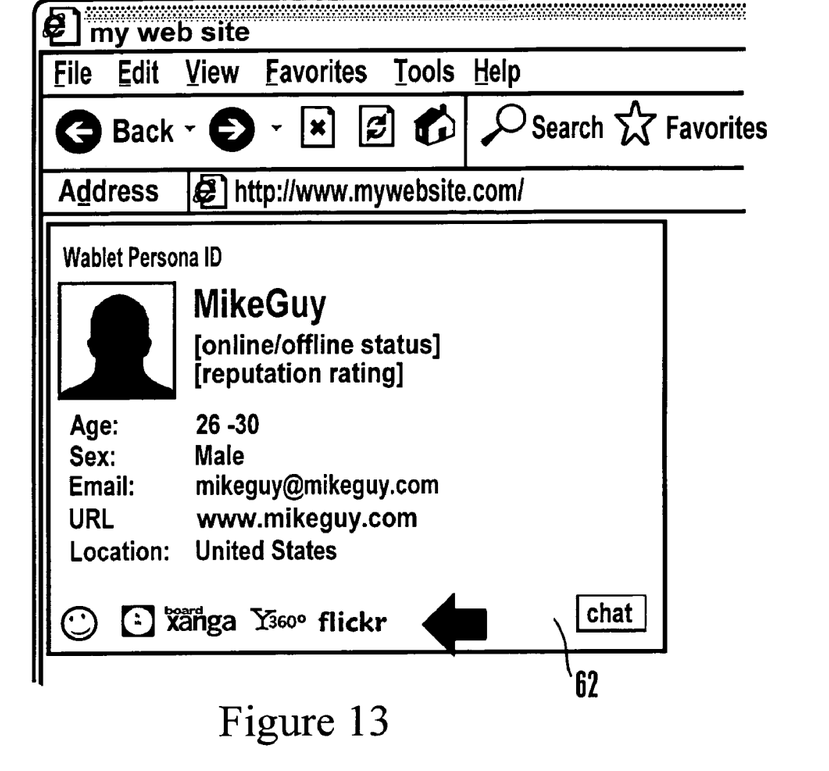

As understood herein, one of the challenges of providing reasonable anonymity and privacy in Internet transactions is that a user should be able to present an alternative to personal or private information to validate their worth within the context of the transaction. In addition to system-specific reputation, some implementations of the present invention can provide a mechanism for users to "decorate" their persona digital identifications with publicly available information relating either to reputation or identity from third party websites, referred to herein as "badges" and accessible to a buddy by clicking on an icon 60 in FIG. 13.

A badge is a validated graphical link to another website that contains reputation or identity information. An example of a badge may be a top 1000 reviewer rating attained by a user. A rating of this type provides reputation information that can increase the value of a persona ID. The difference between a badge and a normal link is that badges are displayed only if they are validated to be owned by the owner of the persona.

This validation may be achieved by one of two mechanisms:

1. When the user deposits a wablet access point on website. In addition to the access point features discussed above, a special type of tracking code may be placed on a site as a tracking mechanism to prove ownership of that site. The system server can generate a unique tracking code that is specific to the URL where the access point is embedded in such a way that the existence of the code on that site is proof that the owner of the access point is the owner of the site. The same mechanism can also be used for badges to prove ownership of the badge.

The mechanics of the tracking message are such that an identifier in the form of HTML code or reference link with routing information related to a user is placed on the users website by the user. Any loading of the page containing this tracking reference provides the wablet server 32 with a means of validating that the user specified by the routing number contained in the URL or code reference owns the web site where this tracking code was placed.

2. The user specifies a user name and login for the website that he wishes to use as a badge for his persona. The wablet server 32 automatically signs into the site using this user name and password to validate that the user owns the link indicated on the badge. Once the unique link is validated the badge will appear on their persona.

Figure 14:
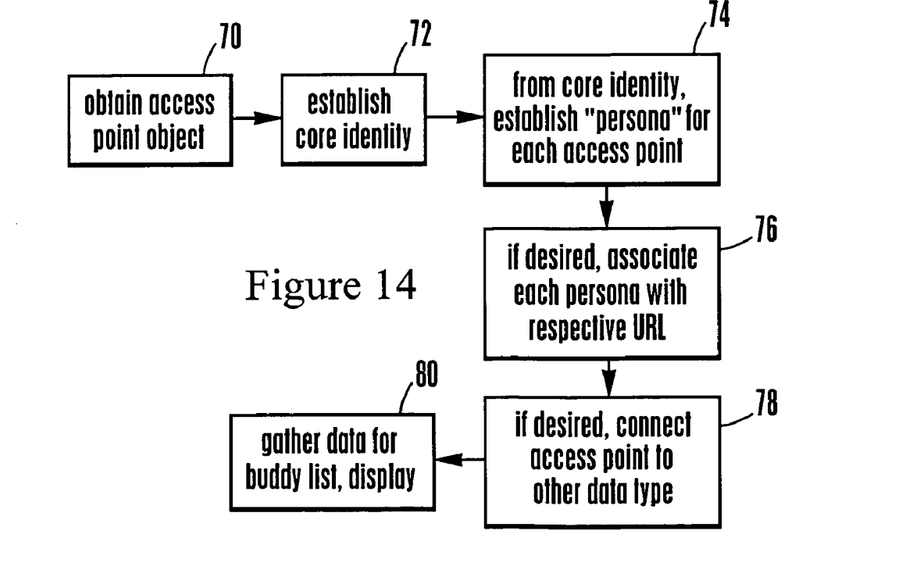
FIG. 14 is a flow chart for establishing an access point.

Now referring to FIG. 14, a non-limiting example of how a user of the user computer 12 can establish one or more access point objects 24, 26 is shown. An access point object is obtained from the wablet server 32 at block 70. Essentially, a template of an object is obtained and configured in accordance with logic below.

Moving to block 72, the user establishes a single core identity which contains concrete information about the users name, age, location, and other identifying information, such as demographic information and social and commercial reputation information. Moving to block 74, from the core ID a "persona" is established for each access point sought to be created. A persona essentially incorporates a subset of the core ID.

More particularly, as recognized herein Internet communications can require varying degrees of identity disclosure, depending on the context of the communication, and this is provided for by the use of personas. As can be appreciated from the above description, a persona is a contextually relevant representation or abstraction of a user's identity and reputation. A user can have multiple personas attached to a core ID, where each persona derives its information from the core ID.

To illustrate, a customer persona does not need to display age or sex as that information may be irrelevant or undesirable for a merchant to buyer transaction. In this case, a persona for an access point for a customer on a commercial web site may not contain personal demographic information. Instead, reputation information is attached to the persona of the access point. Reputation is also contextual since a user's reputation in one social context need not have any bearing on their reputation in another (in the same way as someone's reputation as a husband or father is separate form their reputations as a business man or professional).

A social networking persona, on the other hand, is generally neither useful nor desirable without some disclosure of age, sex and location, since both dating and friendship related transactions often rely on this information. However, a partial disclosure of information (or an abstraction of the underlying concrete information) is often desirable in social networking contexts. For instance, a user may only want to disclose her age range (30-35) and approximate geographic location (state, or Country).

To establish personas from the core ID, in one non-limiting implementation a user assigns a particular persona a context such as social, business, or customer. This assignment may be done by the mechanism of tagging, in which a word representing a semantic concept is used for classification or categorization. Any number of tags can be strung together to further qualify the concept being classified or categorized. The user then selects, for each persona (and, hence, for each desired access point object) identifying data from the core ID. In addition to selecting the data to be displayed, the user can select how this data is displayed by choosing an obfuscation of the data. To facilitate obfuscation, each ID element can carry information about how this data can be obfuscated.

Proceeding to block 76, if desired a single permanent uniform resource locator (URL) can be generated for each persona that allows others access to the user through the corresponding access point object. When a buddy clicks on the URL or enters it into a browser address bar, an access page such as the ones shown in FIGS. 2-13 opens providing information relating to the persona tied to the URL. Also, a method to initiate contact (IM, email, voice, etc.) with the user may be presented in the browser. Contact URLs allow access point owners to leave links (in essence, digital calling cards) on web sites, as signatures to email addresses, embedded in documents, or any similar method of online internet text display, providing a mechanism for instant interactive internet communication. Contact URL's can also be printed on offline medium such as business cards or printed documents, such that the recipient of the document can enter the contact URL into a browser address bar in a pc as mechanism to initiate real time contact with that user.

In any case, each time a user initiates contact with another user, they can present a persona to the other user in the form of a graphical digital ID card that displays selective information about themselves. Feedback from the users that a user comes into contact with can be stored or attached to the persona that was used to initiate the contact. This accumulated feedback attached to a persona serves as part of the users reputation within that context. Preferably, each user is permitted to provide feedback on another user only once per persona.

Block 78 indicates that an access point can be connected to any other data type, e.g., an image, a comment, video, or any other form of media content. With this mechanism, contact with the owner of an access point object can be initiated from a control linked to the object. When this form of contact is initiated a reference to the data from which the contact originated is included in the information sent to the recipient. The same principle holds true for other access points, e.g., if contact is made from a "friendster" or "myspace" account then information reflecting this may be displayed on the incoming "caller ID".

An example of this is a question that can be posted on a site with meta data allowing access or feedback to the owner of the content (in this case the question). Contact with the person asking the question can be initiated in real time by clicking on the question or an icon next to the question. The "owner" of the question is then presented with an incoming contact regarding the question they answered.

As mentioned above, reputation can be part of a persona as a form of disclosure to measure the value of accepting contact from another user. In some implementations this can be achieved through algorithms that generate reputation scores based on data connected to a persona. Examples of data that can be scored include the number of contacts a user has, the number of people connected to persona, the date that the persona was created, the number of trackbacks linking to the persona, the number of questions answered. Additional information can be attached to a persona by means of third parties that can connect to the wablet server 32 using an API or SDK. Using this mechanism third parties can add their own reputation-related information to a particular persona of an access point object.

If desired, the reputation of users connected to a persona and tied to a particular tag for that persona can be used to determine the relevance of this persona in this category for the purpose of directory search. In general, highly connected personas will be determined by the number and quality of their connections, referred to herein as "connectedness". Connectedness may be tied to a particular tag or set of tags that describe the persona, e.g., a persona that is tagged for use in a social network and that has a high connectedness rating will have higher visibility in directory searches performed for the tag.

Also, if desired comments or web contributions from a user can be recorded and associated with a persona. Trackbacks can then be used as a form of reputation building or information sharing. Public comments or contributions made by a user on web sites collectively serve to provide a sense of who this user is and his reputation or worth in the context in which those contributions were made.

Figure 15:
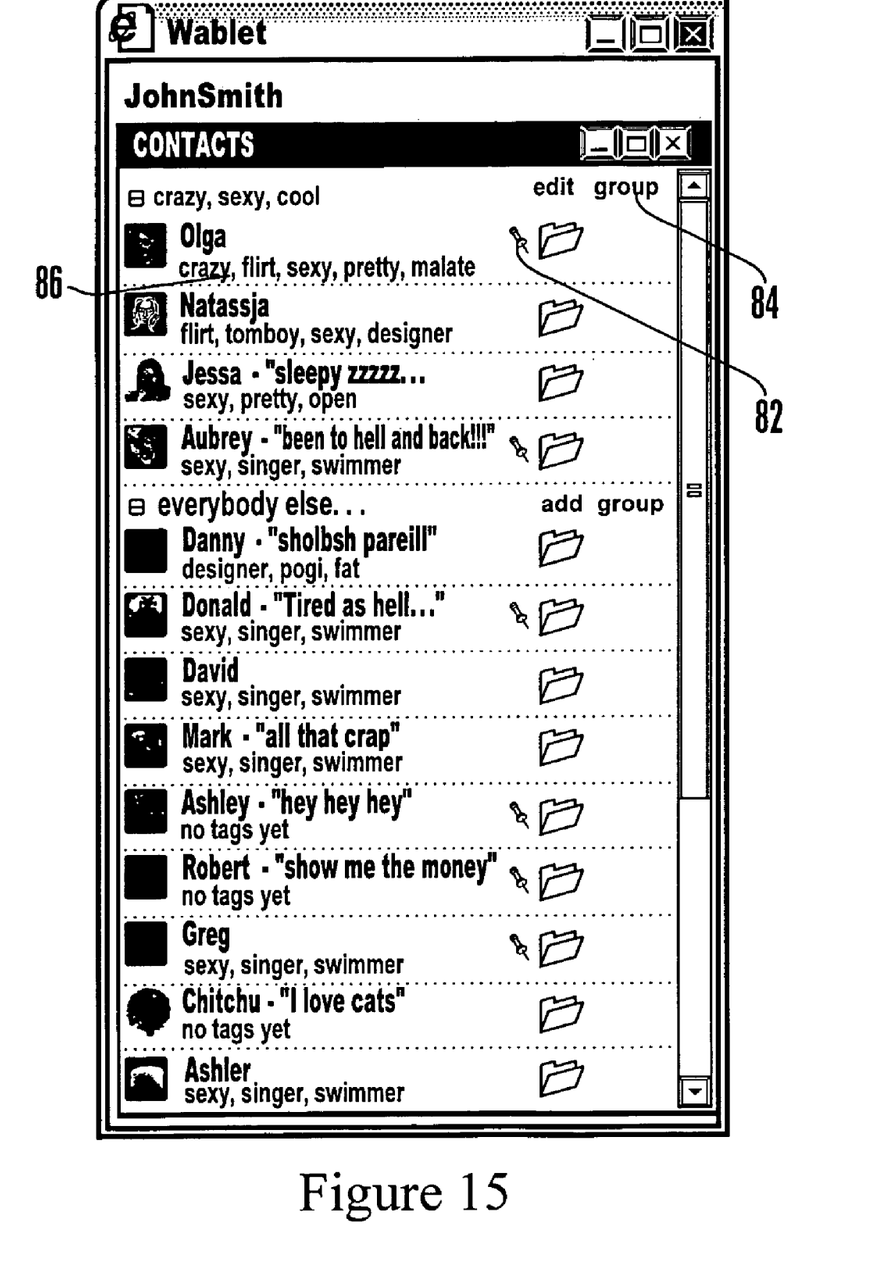
FIG. 15 is a screen display of a buddy list on the user computer.

Moving to block 80, data is gathered for a buddy list for each persona. Because the present invention facilitates users to rapidly come into contact with new people, a typical contact list, one example of which is shown in FIG. 15, is relatively large. In addition to showing online/offline status at 82 and custom status messages, the buddy list may include references (or bookmarks) to people that the owner of an access point might like to contact at a later date, buddies that have contacted the owner through the access point to which the buddy list pertains, people that are part of a network or group as indicated at 84. In one non-limiting implementation, a group object pointed to at 94 is a mechanism to display contacts based on a set of tags, e.g., "business" and "women". All contacts who are tagged with both of these words would be displayed within that grouping. In any case, the bookmark/watch list and buddy/contact list are two different lists, in that contacts are people with whom the access point object user shares online presence information within the scope of their particular personas. For instance, if a buddy and a user connect using respective business personas, the user sees that the buddy is online whenever the buddy's business persona general status is set to be online, and vice-versa, a consensual arrangement. Bookmarks, on the other hand, allow a user to track the online presence of an access point that has been encountered on the Web, which is not consensual. A bookmark contact object displays the public Web presence of the access point, along with the URL from whence it came. This is useful if, e.g., a Web surfer has come across several access points he would like to contact later, without having to revisit the corresponding Web pages each time just to see if they are online.

Categorization tags 86 may be added by the owner to contacts on the buddy list to provide identifying information about contacts and serve as a means to categorize large contact lists. In addition to providing persona information about the contacts in the contact list, each contact can also include information about the web site where the access point was first discovered (if any), and the persona that was used to connect to this contact.

In some implementations, each contact on the buddy list can publish data about her current public online actions to other users that are subscribed to receive this data. Using this method a contact list can display syndicated real time data about each contact's public online activities, e.g., the music that a contact is listening to, a blog entry just posted, a comment just made at a blog, a web site that has just been bookmarked, a video that was just watched by the contact, or a group chat in which the contact is involved. These activities can be displayed as notifications in the contact list to the user that is subscribed to be alerted to these events. The user can also be notified of these events through offline messaging to be retrieved later from a web interface.

Other features that can be included in some implementations includes contact network discovery, in which members of a contact network can see each others' networked contacts (accepting a contact as a network provides an option to allow users to discover contacts through their networks contacts). If a mutual agreement is reached between any two users to belong to each other group or network, then those users can cross-divulge lists of users who are part of each others' network. Networked contacts can be bookmarked to be part of a user's contact list, and when contact is initiated the initiating user will be presented a networked contact of the mutual party through whom they are connected. In the case of multiple degrees of separation, each degree of separation will be listed as part of the introduction.

Below, additional non-limiting features that may be implemented are discussed.

Communication and Presence Routing Mechanisms

The present system may allow for routing from several different forms of communication ID's to be handled through one central system. The system may also allow for presence status information to be displayed and updated in real-time to any number of viewers on the web.

Anti-Abuse

All contact can be blocked from a particular buddy, regardless of which persona the buddy is attempting to use to gain contact with the user/owner of an access point. A rating based on the number of users that have blocked specific contact from a persona can be generated. Also, an access point owner can block all personas of another user/buddy from web access point communication without having to know what the users other personas are. The system can allow for the possibility of removing the block in the future. This can be done on a system-wide basis (e.g., "block all personas of this user from all access to all of my personas"), or a partial basis (e.g., "block all personas that use this user's Friendster badge from my social networking persona only, but let them leave me a message for me to retrieve later"). The system can thus record and report in detail or aggregate some combination of:

1. how many times a user has been blocked, 2. how severe the block was, and 3. how many times the person doing the blocking has blocked other people.

Multiple Contextual Personas Maintained from a Single Interface

The system 10, owing to the above-described contextual personas, allows for multiple representations of ID and reputation based on the context in which a user is presenting themselves. The system provides a mechanism for a user to contact and communicate with others as a socialite, hobbyist, businessman, vendor, client, or other "persona". Each persona carries a particular view of the identity and reputation of the user.

SDK's

In some implementations, the system 10 may provide a number of software development kits (SDKs) or application programming interfaces (APIs) that allow third parties to tie into the wablet system. For instance, a collaboration SDK can be provided that allows online applications that require collaboration to use the system 10 as a collaboration platform. Collaborator personas can be added to any document or media type, allowing for notification of collaborators through access points whenever the object of the collaboration is modified. Additionally, assignment of tasks, comments, and revisions can be passed to the other collaborators automatically and in real time using wablet's communication infrastructure.

Also, an identity SDK can be provided that can be queried from any persona as a means to login or validate a user to other web sites or services. Moreover, an IM SDK may be provided to allow third parties to automatically register and create personas from another web site or service based on information about the user that is already known to that site or service. Using the IM SDK, web sites can provide a full community IM infrastructure to their users. In addition, a reputation SDK can allow third parties to either query, modify, or append reputation information to a persona. Each third party site or service can provide a reputation score, a legend for that score, and a link to an explanation of the scoring criteria as well as details. Users can choose whether or not they wish to display reputation information. And, a contact notification SDK can allow third party sites or services to publish information related to their users that can be pushed out as notifications on the wablet contact list.

With the above disclosure in mind, it may now be appreciated that a user can choose to be visible as "online" and reachable by anybody including anonymous buddies on, e.g., a business home page, and at the same time be seen as "offline" and/or only visible to close friends on a social networking page, with the user's presence in each of these web pages being managed independently from a single computer 12 by the user. The access points also have the ability to take offline messages from buddies (even if the user is online) by routing buddy communication to an account that lets the user review all online and offline messages. Additionally, when the user is contacted by other wablet members through any of the web access points 24, 26, their caller ID/profile information can be displayed as part of the incoming chat request, allowing the user to review it before accepting the chat.

Figure 16:
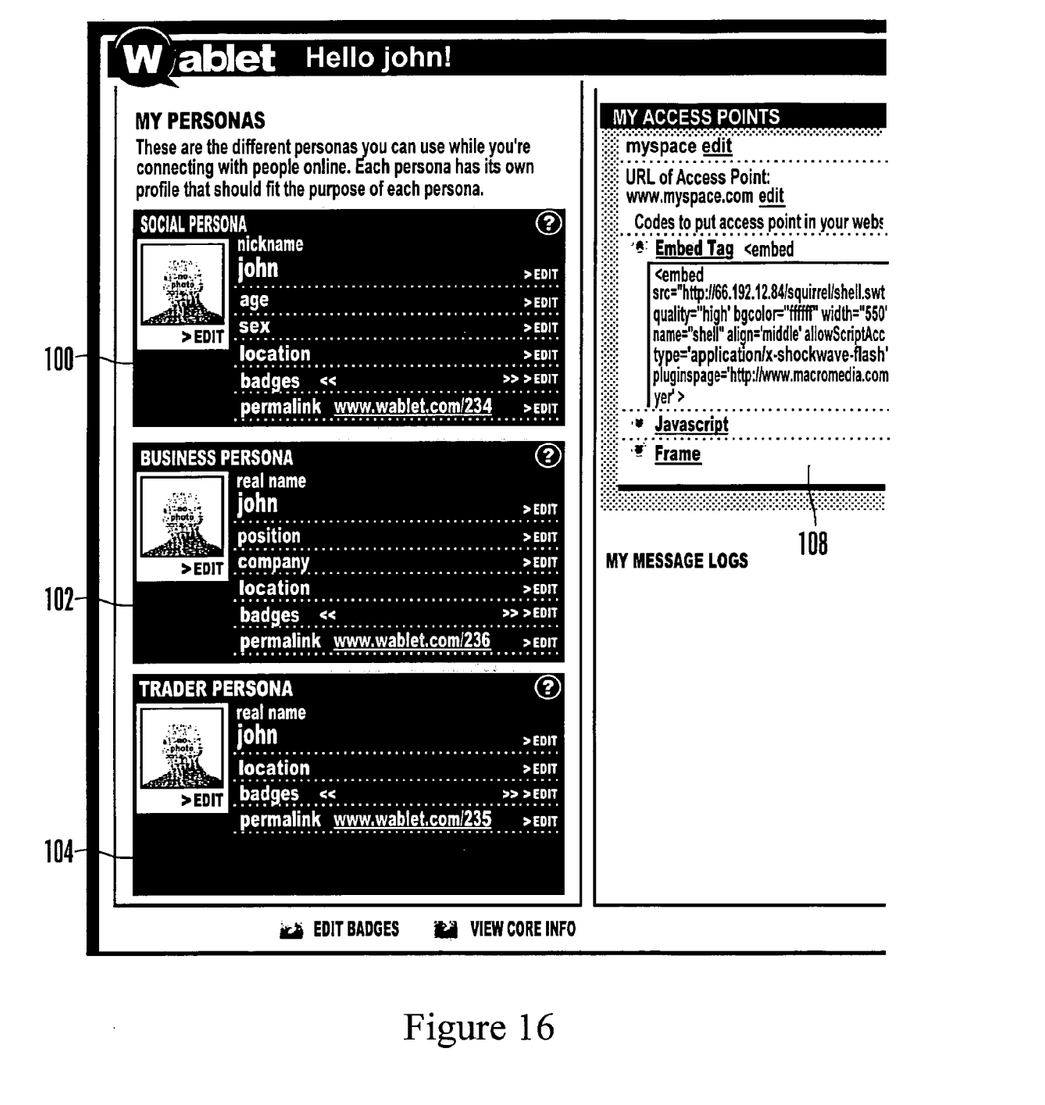
FIG. 16 is a screen display of an access point management page.

FIG. 16 shows an access point management page that the owner can view to manage all of his access points. In FIG. 16, only three access points are shown and each one is associated with a persona different from the personas of the others, it being understood that more than three access points can be used and that a single persona may establish plural access points.

As shown in FIG. 16, the access point owner can view a social access point 100, a business access point 102, and a trader access point 104. For each access point the owner can define personal information to be displayed, such as owner age, sex, location, etc.; badges to be listed; company information, etc. Also, the threshold for entering an access point (e.g., "guests and members", "members only", "ebay traders only", etc.) can be established for each access point. The owner can also monitor any buddy communications on any access point, and can selectively define the owner's status for each access point independently of the status shown on other access points. For example, the social access point 100 might indicate "tired and grumpy", the business access point 102 might indicate "online", and the trader access point 104 might indicate "offline".

The window 108 on the right side of FIG. 16 shows access point object code that the user can cut and paste into a web site to establish an access point. If desired, the system server can automatically deposit an access point object on a web site if the user simply gives the server the address of the web site.

More than one buddy can open communication with an owner of an access point to facilitate group chat.

Various gating or threshold mechanisms to allow contact to a user are discussed above. Additionally, a transactional mechanism can be used in which a buddy must pay to get access to the user, thereby providing for revenue streams from consulting and a variety of other related businesses. This is also relevant to the real time Q&A example.

Also, as stated above the contact gating mechanism can include screening for robots, and can also include, if desired, automated thresholds for minimum reputation, or identity elements required to initiate contact, or financial transactions required.

It is to be understood that an access point may include group chat, and/or avatar based chats. That is, the present system can also be embodied in group chat, or avatar based chat where each participant's ability to enter the chat is based on similar identity, reputation, etc. As but one non-limiting example, a web page can have a group chat access point object that hosts legal discussions in a particular time and place, and to enter this chat a buddy would be required to present a persona that has a validated claim to bar membership.

While the particular SYSTEM AND METHOD FOR PEER-TO-PEER INTERNET COMMUNICATION is herein shown and described in detail, it is to be understood that the subject matter which is encompassed by the present invention is limited only by the claims.

What is claimed is:

1. A method for Internet communication comprising:
   providing an access point object to a depositing user using a tangible non-transitory computer processor, the access point object being depositable by the depositing user on any Web page permitting Internet users to add markup language code to the Web page; and
   using the access point object to initiate communication between a buddy and the depositing user through respective browsers of the depositing user and buddy, the depositing user not being constrained to be accessing the Web page when communicating with the buddy using the respective browser, wherein the access point object is unique to the depositing user,
   providing an interface using the access point object that both displays the online presence of the depositing user and provides a mechanism by which the depositing user can be contacted and communicated with from within the web page where the access point object is embedded, the depositing user being enabled to deposit a unique network address pointing to a calling card web page that contains an embedded access point such that the network address can be selected by a buddy to transport a browser of the buddy to the calling card web page that contains information about the depositing user as well as an access point object configured for facilitating communicating with the depositing user from directly within the calling card web page such that the depositing user displays his online presence and provides a means of contact without revealing an email address or identity.

2. The method of claim 1, wherein the user accesses a communication web site different than the Web page to communicate with the buddy using the access point object.

3. The method of claim 1, wherein the access point object displays an online status of the user.

4. The method of claim 1, wherein the access point object permits a prospective buddy a choice of logging in anonymously or with a validated user name, the validated user name being associated with verifiable user information.

5. The method of claim 1, wherein the access point object screens for computer-initiated buddy communication requests.

6. The method of claim 1, comprising screening non-anonymous buddies for reputation.

7. The method of claim 1, comprising screening non-anonymous buddies for identity.

8. The method of claim 1, comprising screening non-anonymous buddies for group affiliation.

9. The method of claim 1, wherein the access point object displays personal information about the user.

10. The method of claim 2, wherein a message from the buddy to the user when the user is offline is stored on the communication web site.

11. The method of claim 1, wherein the user derives plural access point objects from core identity information the user has established, each access point object being associated with a respective persona, each persona being associated with a respective group of elements that is a subset of the core identity information, each group of elements being different from other groups of elements such that the personas associated with the respective access point objects are different from each other.

12. The method of claim 11, wherein a first persona indicates commercial reputation of a user and no demographic information of the user, the corresponding access point object being deposited on a commercial Web site.

13. The method of claim 12, wherein a second persona indicates no commercial reputation of a user and indicates demographic information of the user, the corresponding access point object being deposited on a social networking Web site.

14. The method of claim 11, wherein the user can manage all access point objects using the communication web site.

15. The method of claim 14, wherein the user can establish, for each access point, the status of whether the user for purposes of the access point is online.

16. The method of claim 14, wherein the user can establish, for each access point, a threshold of permitted contact for the access point.

17. A non-transitory computer accessing a markup language object deposited by an owner of the object on any Web page permitting Internet users to add markup language code to the Web page, the object establishing a calling card of the owner through which a buddy can initiate real time communication with the owner using browsers of the owner and buddy without requiring that the owner and buddy be on the same web page, wherein
the object is unique to the owner of the object,
the object provides an interface that both displays the online presence of the owner and provides a mechanism by which the owner can be contacted and communicated with from within the web page where the object is embedded, the owner being enabled to deposit a network address pointing to an owner web page that contains an embedded access point such that the network address can be selected by a buddy to establish communication between a browser of the buddy and the owner web page, the owner web page presenting information about the depositing user as well as facilitating communicating with the owner from directly within the owner web page such that the owner displays his online presence and provides a means of contact.

18. The computer of claim 17, wherein the markup language object is an access point object depositable by the owner on any Web page permitting Internet users to add markup language code to the Web page, whereby, using the access point object, a buddy can initiate communication with the owner directly through respective browsers of the owner and buddy.

19. The computer of claim 18, wherein the access point object displays an online status of the owner.

20. The computer of claim 18, wherein the access point object permits a prospective buddy to choose to log in using an anonymous name or a validated user name.

21. The computer of claim 18, wherein the access point object screens for computer-initiated buddy communication requests.

22. The computer of claim 18, wherein the access point object screens non-anonymous buddies for at least one of reputation, identity, or group affiliation.

23. The computer of claim 18, wherein the access point object displays personal information about the owner.

24. The computer of claim 18, wherein the access point object permits the buddy to send a message the owner without the owner being online, the message being stored for access thereof by the owner.

25. The computer of claim 18, wherein the owner derives plural access point objects from core identity information the owner has established, each access point object being associated with a respective persona, each persona being associated with a respective group of elements that is a subset of the core identity information, each group of elements being different from other groups of elements such that the personas associated with the respective access point objects are different from each other.

26. The computer of claim 25, wherein a single persona can be used to establish plural access points.

27. The computer of claim 26, comprising a display for displaying an access point management page showing plural access points and permitting the owner to establish attributes of each access point.

28. A system for facilitating communication over a wide area network between at least one user of at least one access point and at least one buddy, comprising:
a non-transitory computer-instantiated server on the network and communicating with a computer of the user for allowing the user to establish core identity information, the user being permitted to derive at least first and second access points from the core identity information, the first and second access points being associated with respective first and second personas, each persona being associated with a respective group of elements that is a subset of the core identity information, each group of elements being different from other groups of elements such that the first persona is different from the second persona, the first access point being depositable by the user on a first web site and the second persona being depositable by the user on a second web site, wherein the first access point provides an interface that both displays the online presence of the user and provides a mechanism by which the user can be contacted and communicated with from within the first web site where the first access point is embedded, the user being enabled to deposit a network address pointing to a first web page that contains an embedded access point such that the network address can be selected by the buddy to establish communication between a browser of the buddy and the first web page, the first web page presenting information about the user as well as facilitating communicating with the user from directly within the first web page such that the user displays his online presence and provides a means of contact.

29. The system of claim 28, wherein the first persona indicates commercial reputation of a user and no demographic information of the user, the corresponding first access point being deposited on a commercial Web site.

30. The system of claim 28, wherein the second persona indicates no commercial reputation of a user and indicates demographic information of the user, the corresponding second access point being deposited on a social networking Web site.

31. The system of claim 28, wherein at least the first or second web site is registered to the user.

32. The system of claim 28, wherein the first and second access points display an online status of the user, the status displayed by the first access point being independent of the status displayed by the second access point.

33. The system of claim 28, wherein the first and second access points permit a prospective buddy to choose to log in using an anonymous name or a validated user name.

34. The system of claim 28, wherein the first and second access points screen for computer-initiated buddy communication requests.

35. The system of claim 28, wherein the first and second access points screen non-anonymous buddies for reputation and/or identity and/or group affiliation.

36. The system of claim 28, wherein the first and second access points display personal information about the user.

* * * * *